United States Patent
Huang et al.

(10) Patent No.: US 11,072,698 B2
(45) Date of Patent: Jul. 27, 2021

(54) COMPOSITION COMPRISING HETEROPHASIC PROPYLENE COPOLYMER

(71) Applicant: SABIC GLOBAL TECHNOLOGIES B.V., Bergen op Zoom (NL)

(72) Inventors: Ting Huang, Shanghai (CN); Kai Guo, Shanghai (CN); Yang Fu, Geleen (NL); Ji Zhou, Shanghai (CN); Dake Shen, Shanghai (CN); Maria Soliman, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 39 days.

(21) Appl. No.: 16/635,666

(22) PCT Filed: Aug. 2, 2018

(86) PCT No.: PCT/EP2018/071068
§ 371 (c)(1),
(2) Date: Jan. 31, 2020

(87) PCT Pub. No.: WO2019/030123
PCT Pub. Date: Feb. 14, 2019

(65) Prior Publication Data
US 2021/0122906 A1 Apr. 29, 2021

(30) Foreign Application Priority Data

Aug. 8, 2017 (EP) .................. 17185326

(51) Int. Cl.
| | |
|---|---|
| C08L 23/08 | (2006.01) |
| C08L 23/16 | (2006.01) |
| C08F 210/14 | (2006.01) |
| C08F 210/16 | (2006.01) |
| C08L 23/12 | (2006.01) |
| C08F 210/02 | (2006.01) |

(52) U.S. Cl.
CPC ........... *C08L 23/12* (2013.01); *C08L 23/0815* (2013.01); *C08L 23/16* (2013.01); *C08F 210/02* (2013.01); *C08F 210/14* (2013.01); *C08F 210/16* (2013.01); *C08F 2500/08* (2013.01); *C08F 2500/12* (2013.01); *C08F 2500/27* (2021.01); *C08L 2205/03* (2013.01); *C08L 2207/02* (2013.01); *C08L 2666/54* (2013.01); *C08L 2666/58* (2013.01); *C08L 2666/62* (2013.01); *C08L 2666/72* (2013.01)

(58) Field of Classification Search
None
See application file for complete search history.

(56) References Cited

U.S. PATENT DOCUMENTS

| | | |
|---|---|---|
| 4,399,054 A | 8/1983 | Ferraris et al. |
| 4,472,524 A | 9/1984 | Albizzati |
| 5,017,714 A | 5/1991 | Welborn, Jr. |
| 5,324,820 A | 6/1994 | Baxter |
| 2011/0064931 A1* | 3/2011 | Tse .......................... C08L 23/10 428/220 |
| 2014/0011937 A1 | 1/2014 | Nagata et al. |

FOREIGN PATENT DOCUMENTS

| | | |
|---|---|---|
| EP | 2599829 A1 | 6/2013 |
| WO | 2006010414 A1 | 2/2006 |
| WO | 2015161398 A1 | 10/2015 |
| WO | WO-2015161398 A1 * | 10/2015 .......... C08L 23/0815 |

OTHER PUBLICATIONS

International Search Report for International Application No. PCT/EP2018/071068, International Filing Date Aug. 2, 2018, dated Sep. 19, 2018, 3 pages.
S. Van Der Ven, Polypropylene and other Polyolefins, Polymer Science 7, Elsevier 1990, 11 pages.
Written Opinion for International Application No. PCT/EP2018/071068, International Filing Date Aug. 2, 2018, dated Sep. 19, 2018, 6 pages.

* cited by examiner

*Primary Examiner* — Richard A Huhn
(74) *Attorney, Agent, or Firm* — Cantor Colburn LLP

(57) ABSTRACT

The invention relates to a composition comprising (A) a propylene-based polymer, (B) an elastomer of ethylene and α-olefin comonomer having 4 to 10 carbon atoms and (C) an inorganic filler,
wherein (A) the propylene-based polymer has a melt flow index of 60 to 150 dg/min measured according to ASTM D1238 (2.16 kg/230° C.) and
wherein (B) the elastomer has a density of 0.840 to 0.865 g/cm$^3$,
wherein (B) the elastomer has a melt flow index of 3 to 13 dg/min measured in accordance with ASTM D1238 using a 2.16 kg weight and at a temperature of 190° C.,
wherein the amount of (B) the elastomer is 2 to 30 wt % based on the total composition,
wherein the amount of (C) the inorganic filler is 0.1 to 30 wt % based on the total composition.

18 Claims, No Drawings

COMPOSITION COMPRISING HETEROPHASIC PROPYLENE COPOLYMER

CROSS REFERENCE TO RELATED APPLICATIONS

This application is a National Stage application of PCT/EP2018/071068, filed Aug. 2, 2018, which claims the benefit of European Application No. 17185326.0, filed Aug. 8, 2017, both of which are incorporated by reference in their entirety herein.

The invention relates to a composition comprising a propylene-based polymer, to a process for obtaining such composition, to the use of such composition and an article comprising such composition.

Propylene-based polymers are used for many applications. Propylene-based polymers can be a propylene homopolymer or a single-phase propylene copolymer or a heterophasic propylene copolymer.

One important property for a polypropylene composition is its processability, which is indicated by the melt flow index (MFI) of the composition. It is a challenge to obtain a composition with a good processability and good mechanical properties such as impact strength.

It is an object of the invention to provide a polypropylene composition with a good processability and good mechanical properties such as impact strength.

Accordingly, the present invention provides a composition comprising (A) a propylene-based polymer, (B) an elastomer of ethylene and α-olefin comonomer having 4 to 10 carbon atoms and (C) an inorganic filler,
wherein (A) the propylene-based polymer has a melt flow index of 60 to 150 dg/min measured according to ASTM D1238 (2.16 kg/230° C.) and
wherein (B) the elastomer has a density of 0.840 to 0.865 g/cm$^3$,
wherein (B) the elastomer has a melt flow index of 3 to 13 dg/min measured in accordance with ASTM D1238 using a 2.16 kg weight and at a temperature of 190° C.,
wherein the amount of (B) the elastomer is 2 to 30 wt % based on the total composition,
wherein the amount of (C) the inorganic filler is 0.1 to 30 wt % based on the total composition.

It was surprisingly found that the addition of an inorganic filler and a specific elastomer to a propylene-based polymer leads to a significant improvement in the impact strength while maintaining the MFI to a high level.

(A) Propylene-Based Polymer

The polypropylene-based polymer has a melt flow index of 60 to 150 dg/min, measured according to ASTM D1238 (2.16 kg/230° C.), and may be a propylene homopolymer, a propylene-ethylene copolymer or a heterophasic propylene copolymer, as described below.

Homopolymer and Single-Phase Copolymer

The polypropylene-based polymer may be a propylene homopolymer or a propylene-ethylene copolymer including random copolymers and (multi)block copolymers. The copolymer is preferably a random copolymer. The copolymer may consist of e.g. 96-99 wt % of propylene and 1-4 wt % of ethylene, based on the total weight of the propylene-based polymer.

Heterophasic Propylene Copolymer

Heterophasic propylene copolymers, also known as impact propylene copolymers or propylene block copolymers, are an important class of polymers due to their attractive combination of mechanical properties, such as impact strength over a wide temperature range and their low cost. These copolymers find a wide range of applications ranging from the consumer industry (for example packaging and housewares), the automotive industry to electrical applications.

Heterophasic propylene copolymers are generally prepared in one or more reactors, by polymerization of propylene in the presence of a catalyst and subsequent polymerization of an ethylene-α-olefin mixture. The resulting polymeric materials are heterophasic, but the specific morphology usually depends on the preparation method and monomer ratios used.

The heterophasic propylene copolymers employed in the process according to present invention can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; Polypropylene and other Polyolefins, by Ser van der Ven, Studies in Polymer Science 7, Elsevier 1990; WO06/010414, U.S. Pat. Nos. 4,399,054 and 4,472,524. Preferably, the heterophasic propylene copolymer is made using Ziegler-Natta catalyst.

The heterophasic propylene copolymer may be prepared by a process comprising
polymerizing propylene and optionally ethylene and/or α-olefin in the presence of a catalyst system to obtain the propylene-based matrix and
subsequently polymerizing ethylene and α-olefin in the propylene-based matrix in the presence of a catalyst system to obtain the dispersed ethylene-α olefin copolymer.

These steps are preferably performed in different reactors. The catalyst systems for the first step and for the second step may be different or same.

The heterophasic propylene copolymer of the composition of the invention consists of a propylene-based matrix and a dispersed ethylene-α-olefin copolymer. The propylene-based matrix typically forms the continuous phase in the heterophasic propylene copolymer. The amounts of the propylene-based matrix and the dispersed ethylene-α-olefin copolymer may be determined by $^{13}$C-NMR, as well known in the art.

The propylene-based matrix consists of a propylene homopolymer and/or a propylene copolymer consisting of at least 96 wt % of propylene monomer units and at most 4 wt % of comonomer units selected from ethylene monomer units and α-olefin monomer units having 4 to 10 carbon atoms.

Preferably, the comonomer in the propylene-α-olefin copolymer is selected from the group of ethylene, 1-butene, 1-pentene, 4-methyl-1-pentene, 1-hexen, 1-heptene and 1-octene, and is preferably ethylene.

Preferably, the propylene-based matrix consists of a propylene homopolymer. The fact that the propylene-based matrix consists of a propylene homopolymer is advantageous in that a higher stiffness is obtained compared to the case where the propylene-based matrix is a propylene copolymer.

The melt flow index (MFI) of the propylene-based matrix (before the heterophasic propylene copolymer is mixed into the composition of the invention), $MFI_{PP}$, may typically be 50 to 300 dg/min, for example 100 to 200 dg/min, measured in accordance with ASTM D1238 using a 2.16 kg weight and at a temperature of 230° C.

The propylene-based matrix is present in an amount of 65 to 95 wt % based on the total heterophasic propylene copolymer. Preferably, the propylene-based matrix is present in an amount of 70 to 90 wt %, for example at least 75 wt % or at least 80 wt % and/or at most 85 wt %, based on the total heterophasic propylene copolymer.

The propylene-based matrix is preferably semi-crystalline, that is it is not 100% amorphous, nor is it 100% crystalline. For example, the propylene-based matrix is at least 40% crystalline, for example at least 50%, for example at least 60% crystalline and/or for example at most 80% crystalline, for example at most 70% crystalline. For example, the propylene-based matrix has a crystallinity of 60 to 70%. For purpose of the invention, the degree of crystallinity of the propylene-based matrix is measured using differential scanning calorimetry (DSC) according to ISO11357-1 and ISO11357-3 of 1997, using a scan rate of 10° C./min, a sample of 5 mg and the second heating curve using as a theoretical standard for a 100% crystalline material 207.1 J/g.

Besides the propylene-based matrix, the heterophasic propylene copolymer also comprises a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form. The particle size of the dispersed phase is typically in the range of 0.05 to 5.0 microns, for example 0.05 to 2.0 microns, as may be determined by transmission electron microscopy (TEM). The amount of the dispersed ethylene-α-olefin copolymer in the heterophasic propylene copolymer may herein be sometimes referred as RC.

Preferably, the amount of ethylene monomer units in the ethylene-α-olefin copolymer is 40 to 65 wt %, for example at least 45 wt % or at least 50 wt % and/or at most 60 wt % or at most 55 wt %. The amount of ethylene monomer units in the dispersed ethylene-α-olefin copolymer in the heterophasic propylene copolymer may herein be sometimes referred as RCC2.

The α-olefin in the ethylene-α-olefin copolymer is preferably chosen from the group of α-olefins having 3 to 8 carbon atoms. Examples of suitable α-olefins having 3 to 8 carbon atoms include but are not limited to propylene, 1-butene, 1-pentene, 4-methyl-1-pentene, 1-hexen, 1-heptene and 1-octene. More preferably, the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer.

The MFI of the dispersed ethylene α-olefin copolymer (before the heterophasic propylene copolymer is mixed into the composition of the invention), $MFI_{EPR}$, may be for example 0.1 to 3 dg/min. $MFI_{EPR}$ is calculated taking into account the MFI of the propylene-based matrix ($MFI_{PP}$) measured according to ASTM D1238 (2.16 kg/230° C.), the MFI of the heterophasic propylene copolymer (MFIheterophasic) measured according to ASTM D1238 (2.16 kg/230° C.) and the amount of the propylene-based matrix in the heterophasic propylene copolymer (matrix content) and the amount of the dispersed phase in the heterophasic propylene copolymer (rubber content (RC)) according to the following formula:

$$MFIEPR = 10\wedge\left(\frac{\text{Log } MFI\text{heterophasic} - \text{matrix content} * \text{Log } MFIPP}{\text{rubber content}}\right)$$

The dispersed ethylene-α-olefin copolymer is present in an amount of 35 to 5 wt %. Preferably, the dispersed ethylene-α-olefin copolymer is present in an amount of 30 to 10 wt %, for example in an amount of at least 15 wt % and/or for example in an amount of at most 25 wt % or at most 20 wt % based on the total heterophasic propylene copolymer.

In the heterophasic propylene copolymer in the composition of the invention, the sum of the total weight of the propylene-based matrix and the total weight of the dispersed ethylene-α-olefin copolymer is 100 wt % of the heterophasic propylene copolymer.

Preferably, the heterophasic propylene copolymer has a fraction soluble in p-xylene at 25° C. (CXS) measured according to ISO 16152:2005 of 35 to 5 wt %. More preferably, the heterophasic propylene copolymer has CXS of 30 to 10 wt %, for example in an amount of at least 15 wt % and/or for example in an amount of at most 25 wt % or at most 20 wt %.

Preferably, the amount of ethylene monomer units in the heterophasic propylene copolymer (sometimes referred as TC2) is in the range of 5 to 15 wt % based on the heterophasic propylene copolymer.

The MFI of the heterophasic propylene copolymer may be 60 to 150 dg/min, for example at least 65 dg/min or at least 70 dg/min and/or at most 130 dg/min, at most 100 dg/min or at most 80 dg/min measured according to ASTM D1238 (2.16 kg/230° C.). Such a range of MFI is suitable for obtaining a heterophasic polypropylene composition with a good processability.

The values of the MFI of the propylene-based matrix ($MFI_{PP}$) and the MFI of the dispersed ethylene-α-olefin elastomer ($MFI_{EPR}$) mentioned herein are understood as the values before the heterophasic propylene copolymer is mixed with component (B) and optional component(s) to obtain the composition according to the invention. The value of the MFI of the heterophasic propylene copolymer (MFI heterophasic) refers to the final MFI of the heterophasic propylene copolymer. To exemplify this:

In case the heterophasic propylene copolymer is not subjected to vis-breaking or shifting by melt-mixing with a peroxide, the MFIheterophasic is the original MFI value of the heterophasic propylene copolymer. In case the heterophasic propylene copolymer is subjected to vis-breaking or shifting by melt-mixing with a peroxide, the MFIheterophasic is the value of the heterophasic propylene copolymer after such vis-breaking or shifting.

Preferably, in the heterophasic propylene copolymer according to the invention, the comonomer in the propylene-α-olefin copolymer is selected from ethylene and the group of α-olefins having 4 to 10 carbon atoms and the α-olefin in the ethylene-α-olefin copolymer is selected from the group of α-olefins having 3 to 8 carbon atoms.

(B) Elastomer

The composition of the invention comprises an elastomer of ethylene and α-olefin comonomer having 4 to 10 carbon atoms. The elastomer has a density of 0.840 to 0.865 $g/cm^3$, for example at least 0.845 $g/cm^3$ or at least 0.850 $g/cm^3$.

The α-olefin comonomer in the elastomer preferably has 4 to 8 carbon atoms and is preferably an acyclic monoolefin such as 1-butene, 1-pentene, 1-hexene, 1-octene, or 4-methyl-1-pentene.

Accordingly, the elastomer is preferably selected from the group consisting of ethylene-1-butene copolymer, ethylene-1-hexene copolymer, ethylene-1-octene copolymer and mixtures thereof. Most preferably, the elastomer is an ethylene-1-octene copolymer. Advantageously, a copolymer of ethylene and 1-octene provides a larger improvement in the impact strength of the composition according to the invention compared e.g. to a copolymer of ethylene and 1-butene having a similar MFR and a similar amount of the comonomer.

Preferably, the elastomer has a density of 0.850 to 0.865 g/cm$^3$. In some embodiments, the density of the elastomer is 0.850 to 0.859 g/cm$^3$ or 0.851 to 0.858 g/cm$^3$. In other embodiments, the density of the elastomer is 0.859 to 0.865 g/cm$^3$ or 0.860 to 0.864 g/cm$^3$.

Elastomers which are suitable for use in the current invention are commercially available for example under the trademark EXACT™ available from Exxon Chemical Company of Houston, Tex. or under the trademark ENGAGE™ polymers, a line of metallocene catalyzed plastomers available from Dow Chemical Company of Midland, Mich. or from Nexlene™ from SK Chemicals The elastomers may be prepared using methods known in the art, for example by using a single site catalyst, i.e., a catalyst the transition metal components of which is an organometallic compound and at least one ligand of which has a cyclopentadienyl anion structure through which such ligand bondingly coordinates to the transition metal cation. This type of catalyst is also known as "metallocene" catalyst. Metallocene catalysts are for example described in U.S. Pat. Nos. 5,017,714 and 5,324,820. The elastomers may also be prepared using traditional types of heterogeneous multi-sited Ziegler-Natta catalysts.

Preferably, the elastomer has a melt flow index of 4 to 10 dg/min measured in accordance with ASTM D1238 using a 2.16 kg weight and at a temperature of 190° C. In some embodiments, the elastomer has a melt flow index of 4 to 6 dg/min measured in accordance with ASTM D1238 using a 2.16 kg weight and at a temperature of 190° C. In other embodiments, the elastomer has a melt flow index of 6 to 10 dg/min measured in accordance with ASTM D1238 using a 2.16 kg weight and at a temperature of 190° C.

The amount of elastomer (B) in the composition of the invention is 2 to 30 wt % based on the total composition. Preferably, the amount of elastomer (B) in the composition of the invention is 10 to 30 wt % based on the total composition.

(C) Inorganic Filler

The composition of the invention comprises an inorganic filler. Suitable inorganic fillers include talc, chalk, clay, mica, glass fibers and carbon fibers. Preferably, the inorganic filler is talc.

Preferably, the inorganic filler has a d50 of 1 to 10 μm. d50 is the mean (or median) particle size, i.e. the particle diameter where 50% of the particles are larger and 50% are smaller. This value may be determined e.g. by techniques based on the principle of light diffraction.

The amount of (C) the inorganic filler in the composition of the invention is 0.1 to 30 wt % based on the total composition. Preferably, the amount of the inorganic filler in the composition of the invention is 5 to 25 wt % or 10 to 20 wt % based on the total composition.

(D) Additives

The composition according to the invention may optionally comprise additives. The additives may include nucleating agents, stabilizers, e.g. heat stabilisers, anti-oxidants, UV stabilizers; colorants, like pigments and dyes; clarifiers; surface tension modifiers; lubricants; flame-retardants; mould-release agents; flow improving agents; plasticizers; anti-static agents; blowing agents.

The skilled person can readily select any suitable combination of additives and additive amounts without undue experimentation. The amount of the additives depends on their type and function and typically is of from 0 to about 10 wt %. The amount of the additives may e.g. be from about 0.1 to about 5 wt %; from about 1 to about 4 wt % or from 1.5 to about 3 wt % based on the total composition.

The sum of all components added in the process of the invention to form the composition comprising (A) the heterophasic propylene copolymer, (B) the elastomer, (C) the inorganic filler and (D) optional additives should add up to 100% by weight.

Preferably, the total of components (A), (B) and (C) is at least 90 wt %, at least 95 wt %, at least 97 wt %, at least 98 wt %, at least 99 wt %, at least 99.5 wt %, at least 99.9 wt % or 100 wt % of the total composition.

Composition

Preferably, the MFI of the composition according to the invention is not very low compared to the MFI of the propylene-based polymer (A). Preferably, [(MFI of the propylene-based polymer in dg/min measured in accordance with ASTM D1238 using a 2.16 kg weight and at a temperature of 230° C.)−(MFI of the composition in dg/min measured in accordance with ASTM D1238 using a 2.16 kg weight and at a temperature of 230° C.)/[amount of the elastomer in the composition in wt %] is at most 0.7 (dg/min)/wt %, preferably at most 0.6 (dg/min)/wt %, for example 0.3 to 0.5 (dg/min)/wt %.

Preferably, the composition has a melt flow index of at least 20 dg/min measured in accordance with ASTM D1238 using a 2.16 kg weight and at a temperature of 230° C.

Process

The composition of the invention may be obtained by a process comprising melt-mixing (A) the propylene-based polymer, (B) the elastomer, (C) the inorganic filler and (D) the optional component by using any suitable means. Accordingly, the invention further relates to a process for the preparation of the composition according to the invention comprising melt mixing (A), (B), (C) and optionally (D).

The melt-mixing of the components may be done in any order. For example, (A) the propylene-based polymer and (D) the optional component may be melt-mixed before melt-mixing with (B) the elastomer and (C) the inorganic filler. A composition of (A) the propylene-based polymer and (D) the optional component for example in the form of a pellet may first be obtained and then be melt-mixed with (B) the elastomer and (C) the inorganic filler. Alternatively, components (A), (B) and (C) are melt-mixed followed by the addition of (D) the optional component, or components (A), (B), (C) and (D) are melt-mixed at the same time.

Preferably, the composition of the invention is made in a form that allows easy processing into a shaped article in a subsequent step, like in pellet or granular form. The composition can be a mixture of different particles or pellets; like a blend of the heterophasic copolymer and a masterbatch of additives. Preferably, the composition of the invention is in pellet or granular form as obtained by mixing all components in an apparatus like an extruder; the advantage being a composition with homogeneous and well-defined concentrations of the additives.

With melt-mixing is meant that the components (B), (C) and/or (D) are mixed with the propylene-based polymer at a temperature that exceeds the melting point of the heterophasic propylene copolymer. Melt-mixing may be done using techniques known to the skilled person, for example in an extruder. Generally, in the process of the invention, melt-mixing is performed at a temperature in the range of 200 to 260° C.

Suitable conditions for melt-mixing, such as temperature, pressure, amount of shear, screw speed and screw design when an extruder is used are known to the skilled person.

Properties of the Composition

In some embodiments, the composition according to the invention has
a flexural modulus according to ASTM D790 of at least 1000 MPa and at least one of:
an Izod impact strength at 23° C. according to ASTM D256 of at least 250 J/m, more preferably at least 300 J/m,
an Izod impact strength at 0° C. according to ASTM D256 of at least 70 J/m, more preferably at least 80 J/m,
an Izod impact strength at −20° C. according to ASTM D256 of at least 55 J/m, more preferably at least 60 J/m and an Izod impact strength at −40° C. according to ASTM D256 of at least 45 J/m, more preferably at least 50 J/m.

In some embodiments, the composition according to the invention has
a flexural modulus according to ASTM D790 of at least 800 MPa and at least one of:
an Izod impact strength at 23° C. according to ASTM D256 of at least 550 J/m, more preferably at least 600 J/m,
an Izod impact strength at 0° C. according to ASTM D256 of at least 450 J/m, more preferably at least 500 J/m,
an Izod impact strength at −20° C. according to ASTM D256 of at least 100 J/m, more preferably at least 120 J/m and
an Izod impact strength at −40° C. according to ASTM D256 of at least 70 J/m, more preferably at least 75 J/m.

The flexural modulus and the Izod impact strength are measured on samples made by injection molding having the required dimensions for the measurements.

Further Aspects

The composition according to the invention may then be processed by any conventional technique known in the art into an article. Suitable examples of processing techniques wherein the composition according to the invention may be used include injection moulding, injection stretch blow moulding, compression moulding, extrusion and extrusion compression moulding, sheet extrusion, thermoforming or thin-walled injection moulding.

The invention further relates to an article comprising the composition according to the invention. In particular, the invention relates to an article comprising the composition according to the invention, wherein the article is made by one of the processing techniques mentioned above. Injection moulding is widely used to produce articles such as for example caps and closures, batteries, pails, containers, automotive exterior parts like bumpers, automotive interior parts like instrument panels, or automotive parts under the bonnet. Extrusion is for example widely used to produce articles, such as rods, sheets, films and pipes. Thin wall injection moulding may for example be used to make thin wall packaging.

Preferably, the article according to the invention is caps and closures, batteries, pails, containers, automotive exterior parts like bumpers, automotive interior parts like instrument panels, or automotive parts under the bonnet.

The invention further relates to the use of the article comprising the composition according to the invention for caps and closures, batteries, pails, containers, automotive exterior parts like bumpers, automotive interior parts like instrument panels, or automotive parts under the bonnet.

For the avoidance of doubt, in the present disclosure:
ASTM D1238 means ASTM D1238-13.
ASTM D256 means ASTM D256-10e1.
ASTM D790 means ASTM D790-17.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXPERIMENTS

Propylene-Based Polymer

Heterophasic propylene copolymer consisting of a matrix of a propylene homopolymer and a dispersed ethylene-propylene copolymer was used. The amount (RC) of the dispersed ethylene-propylene copolymer was 17.50 wt %. The amount (RCC2) of ethylene in the dispersed ethylene-propylene copolymer was 53.30 wt %.

The MFI was as shown in Table 1, measured in accordance with ASTM D1238 using a 2.16 kg weight and at a temperature of 230° C.

TABLE 1

| Matrix (dg/min) | Dispersed phase (dg/min) | MFI ratio of matrix to dispersed | Total (dg/min) |
|---|---|---|---|
| 160.00 | 1.75 | 91.43 | 72.60 |

Elastomer

Elastomers of ethylene and 1-octene as shown in Table 2 were used. The MFI shown below was measured according to ASTM D1238 using a 2.16 kg weight and at a temperature of 190° C.

TABLE 2

| Elastomer | MFI @ 190° C. | Density (g/cm$^3$) |
|---|---|---|
| POE1 | 0.59 | 0.8681 |
| POE2 | 0.91 | 0.857 |
| POE3 | 1.02 | 0.8684 |
| POE4 | 4.87 | 0.8685 |
| POE5 | 27.84 | 0.8678 |
| POE6 | 5 | 0.856 |
| POE7 | 8 | 0.861 |

Inorganic Filler

Talc having a diameter d50 of 6 μm was used.

Compositions as shown in Tables 3 and 4 were made by melt-mixing in a twin screw extruder. In Table 3, the amount of the elastomer was 15 wt % and the amount of the talc was 15 wt %, both with respect to the total composition. In Table 4, the amount of the elastomer was 25 wt % and the amount of the talc was 15 wt %, both with respect to the total composition.

The heterophasic propylene copolymer was pre-mixed with anti-oxidant additives and the elastomer, and then the pre-mixed pellets were dosed to $1^{st}$ main hopper of the extruder. Talc was separately dosed to $2^{nd}$ main hopper of the extruder. The temperature profile in the twin-extruder was 50-150-210-220-230-230-230-230-230-230-230° C., at a throughput of ~25 kg/h at 300 rpm. The pellets were dried under 100° C. for 2 h and then injection molded to prepare the parts for testing by FANUC injection molding machine.

The MFI of the composition was measured according to ASTM D1238 using a 2.16 kg weight at a temperature of 230° C.

Izod impact strength was measured according to ASTM D 256 at temperatures shown in Tables 3 and 4.

Flexural modulus was measured according to ASTM D 790.

The flexural modulus and the Izod impact strength were measured on samples made by injection molding having the required dimensions for the measurements.

TABLE 3

| Experiments | CEx0 | CEx1 | CEx2 | CEx3 | CEx4 | CEx5 | Ex6 | Ex7 |
|---|---|---|---|---|---|---|---|---|
| Elastomer (15 wt %) | — | POE1 | POE2 | POE3 | POE4 | POE5 | POE6 | POE7 |
| MFI2.16 kg/230° C. | 41.9 | 22.5 | 26.6 | 24.2 | 30.8 | 37.4 | 33.2 | 35.5 |
| Decrease in MFI of the composition by 1 wt % elastomer | 0 | 1.29 | 1.02 | 1.18 | 0.74 | 0.3 | 0.58 | 0.43 |
| Flex modulus (MPa) | 1540 | 1150 | 1170 | 1270 | 1220 | 1200 | 1160 | 1190 |
| Notched Izod impact @ RT (J/m) | 44.8 | 119 | 201 | 102 | 284 | 312 | 330 | 325 |
| Notched Izod impact @ 0° C. (J/m) | 28.6 | 70.5 | 83.1 | 68.2 | 66 | 83.6 | 90 | 85 |
| Notched Izod impact @ −20° C. (J/m) | 25.5 | 55.2 | 63.9 | 59 | 45 | 57.8 | 69 | 65 |
| Notched Izod impact @ −40° C. (J/m) | 23.5 | 41.5 | 50.6 | 47.5 | 33.2 | 41.8 | 58 | 52 |

It can be seen that the addition of the elastomer generally leads to a decrease in the MFI. Compositions of Ex 6 and Ex 7 nevertheless have a high MFI. The effect of the elastomer on the MFI of the final composition is also shown in the Table 3 as "Decrease in MFI of the composition by 1 wt % elastomer". This was calculated as: [(MFI of the heterophasic propylene copolymer in dg/min measured in accordance with ASTM D1238 using a 2.16 kg weight and at a temperature of 230° C.)−(MFI of the composition in dg/min measured in accordance with ASTM D1238 using a 2.16 kg weight and at a temperature of 230° C.)/[amount of the elastomer in the composition in wt %]

This parameter indicates how much decrease in the MFI is caused by the elastomer. It can be seen that the decrease in MFI caused by POE6 and POE7 is small.

It can also be seen that the compositions of Ex 6 and Ex 7 have the highest impact strength. Thus, it can be concluded that the compositions of Ex 6 and Ex 7 have a good combination of a high MFI and a high impact strength. Further, the flex modulus is at acceptable levels.

TABLE 4

| Experiments | CEx0 | CEx8 | CEx9 | CEx10 | CEx11 | CEx12 | Ex13 | Ex14 |
|---|---|---|---|---|---|---|---|---|
| Elastomer (25 wt %) | — | POE1 | POE2 | POE3 | POE4 | POE5 | POE6 | POE7 |
| MFI2.16 kg/230° C. | 41.9 | 15.5 | 19.8 | 17.8 | 25.4 | 35.3 | 27.8 | 31.7 |
| Decrease in MFI of the composition by 1 wt % elastomer | 0 | 1.06 | 0.88 | 0.96 | 0.66 | 0.26 | 0.56 | 0.41 |

TABLE 4-continued

| Experiments | CEx0 | CEx8 | CEx9 | CEx10 | CEx11 | CEx12 | Ex13 | Ex14 |
|---|---|---|---|---|---|---|---|---|
| Flex modulus (MPa) | 1540 | 894 | 859 | 1030 | 999 | 908 | 880 | 890 |
| Notched Izod impact @ RT (J/m) | 44.8 | 655 | 678 | 626 | 597 | 427 | 640 | 620 |
| Notched Izod impact @ 0 (J/m) | 28.6 | 537 | 644 | 507 | 486 | 287 | 610 | 540 |
| Notched Izod impact @ −20 (J/m) | 25.5 | 116 | 212 | 122 | 113 | 80.1 | 180 | 150 |
| Notched Izod impact @ −40 (J/m) | 23.5 | 69.8 | 105 | 113 | 60.8 | 61.7 | 99 | 80 |

Table 4 shows a similar trend as Table 3. The compositions of Ex 13 and Ex 14 have a good combination of a high MFI and a high impact strength, while the flexural modulus is at an acceptable level. The composition of CEx 9 has a high impact strength, but the MFI of the final composition is low.

The invention claimed is:

1. A composition comprising
(A) a propylene-based polymer,
(B) an elastomer of ethylene and α-olefin comonomer having 4 to 10 carbon atoms and
(C) an inorganic filler,
wherein (A) the propylene-based polymer has a melt flow index of 60 to 150 dg/min measured according to ASTM D1238 (2.16 kg/230° C.) and
wherein (B) the elastomer has a density of 0.840 to 0.865 g/cm$^3$,
wherein (B) the elastomer has a melt flow index of 3 to 13 dg/min measured in accordance with ASTM D1238 using a 2.16 kg weight and at a temperature of 190° C.,
wherein the amount of (B) the elastomer is 2 to 30 wt % based on the total composition,
wherein the amount of (C) the inorganic filler is 0.1 to 30 wt % based on the total composition, and
wherein the elastomer is an ethylene-1-octene copolymer.

2. The composition according to claim 1, wherein the elastomer has a melt flow index of 4 to 10 dg/min measured in accordance with ASTM D1238 using a 2.16 kg weight and at a temperature of 190° C.

3. The composition according to claim 1, wherein the elastomer has a density of 0.850 to 0.865 g/cm$^3$.

4. The composition according to claim 1, wherein the propylene-based polymer is a heterophasic propylene copolymer consisting of
(a) a propylene-based matrix,
wherein the propylene-based matrix consists of a propylene homopolymer and/or a propylene copolymer consisting of at least 96 wt % of propylene monomer units and at most 4 wt % of ethylene monomer units and/or an α-olefin monomer units having 4 to 10 carbon atoms, based on the total weight of the propylene-based matrix and
wherein the propylene-based matrix is present in an amount of 65 to 95 wt % based on the total heterophasic propylene copolymer and
(b) a dispersed ethylene-α-olefin copolymer, wherein the dispersed ethylene-α-olefin copolymer is an ethylene-propylene copolymer, wherein the ethylene-α olefin copolymer is present in an amount of 35 to 5 wt % based on the total heterophasic propylene copolymer.

5. The composition according to claim 4, wherein the propylene-based matrix is a propylene homopolymer.

6. The composition according to claim 4, wherein
the ethylene-α olefin copolymer is present in an amount of 30 to 5 wt %, based on the total heterophasic propylene copolymer and/or
the amount of ethylene monomer units in the ethylene-α-olefin copolymer is in the range of 40 to 65 wt %, based on the ethylene-α-olefin copolymer.

7. The composition of claim 6, wherein
the ethylene-α olefin copolymer is present in an amount of 25 to 5 wt %, based on the total heterophasic propylene copolymer and/or
the amount of ethylene monomer units in the ethylene-α-olefin copolymer is in the range of 45 to 60 wt %, based on the ethylene-α-olefin copolymer.

8. The composition according to claim 4, wherein
the propylene-based matrix has a melt flow index of 50 to 300 dg/min, measured in accordance with ASTM D1238 using a 2.16 kg weight and at a temperature of 230° C. and/or
the dispersed ethylene-α-olefin copolymer has a melt flow index of 0.1 to 3 dg/min measured in accordance with ASTM D1238 using a 2.16 kg weight and at a temperature of 230° C.

9. The composition of claim 8, wherein the propylene-based matrix has a melt flow index of 100 to 200 dg/min measured in accordance with ASTM D1238 using a 2.16 kg weight and at a temperature of 230° C.

10. The composition according to claim 4, wherein [(MFI of the heterophasic propylene copolymer in dg/min measured in accordance with ASTM D1238 using a 2.16 kg weight and at a temperature of 230° C.)−(MFI of the composition in dg/min measured in accordance with ASTM D1238 using a 2.16 kg weight and at a temperature of 230° C.)/[amount of the elastomer in the composition in wt %] is at most 0.7 (dg/min)/wt %.

11. The composition of claim 4, wherein [(MFI of the heterophasic propylene copolymer in dg/min measured in accordance with ASTM D1238 using a 2.16 kg weight and at a temperature of 230° C.)−(MFI of the composition in dg/min measured in accordance with ASTM D1238 using a 2.16 kg weight and at a temperature of 230° C.)/[amount of the elastomer in the composition in wt %] is at most 0.6 (dg/min)/wt %.

12. The composition of claim 4, wherein [(MFI of the heterophasic propylene copolymer in dg/min measured in accordance with ASTM D1238 using a 2.16 kg weight and at a temperature of 230° C.)−(MFI of the composition in dg/min measured in accordance with ASTM D1238 using a 2.16 kg weight and at a temperature of 230° C.)/[amount of the elastomer in the composition in wt %] is 0.3 to 0.5 (dg/min)/wt %.

13. The composition according to claim 1, wherein the amount of the elastomer is 10 to 30 wt % based on the total composition.

14. The composition according to claim 1, wherein the composition has a melt flow index of at least 20 dg/min measured in accordance with ASTM D1238 using a 2.16 kg weight and at a temperature of 230° C.

15. The composition according to claim 1, wherein the inorganic filler is selected from the group consisting of calcium carbonate, talc, magnesium carbonate, synthetic carbonates, wollastonite, dolomite, gypsum, kaolinite, aluminum hydroxide, aluminosilicates, mica, natural siliconates, silica containing aggregates, zeolites and mixtures thereof.

16. The composition according to claim 1, wherein the inorganic filler has a d50 of 1 to 10 μm.

17. A process for the preparation of the composition according to claim 1, comprising melt mixing (A), (B) and (C).

18. An article comprising the composition of claim 1.

* * * * *